United States Patent [19]

Neufeld

[11] 4,415,129
[45] Nov. 15, 1983

[54] THUMB STOP RETENTION AND ANTI-RATTLE SPRING

[75] Inventor: Henry L. Neufeld, Tulsa, Okla.

[73] Assignee: Brunswick Corporation, Skokie, Ill.

[21] Appl. No.: 448,415

[22] Filed: Dec. 9, 1982

Related U.S. Application Data

[63] Continuation of Ser. No. 289,036, Jul. 31, 1981, abandoned.

[51] Int. Cl.³ .............................................. A01K 89/01
[52] U.S. Cl. .............................................. 242/84.2 A
[58] Field of Search ................... 242/84.2 A, 84.2 R, 242/84.21 A

[56] References Cited

U.S. PATENT DOCUMENTS 3,223,346 12/1965 Fowler .......................... 242/84.2 A Primary Examiner—Billy S. Taylor
Attorney, Agent, or Firm—John G. Heimovics

[57] ABSTRACT

A spring means associated with a pivotable thumb button (29) on a spinning type reel for urging the button away from its depressed position. An elongate resilient spring member (424, 524, 624, 724, 824) is engagable adjacent its opposing ends with the reel cover (12) and the underside of the thumb button (29). A tab (420), depending from the reel cover, engages the resilient member intermediate its ends so as to retain the spring and prevent longitudinal displacement of the same relative to the reel housing (10).

5 Claims, 9 Drawing Figures

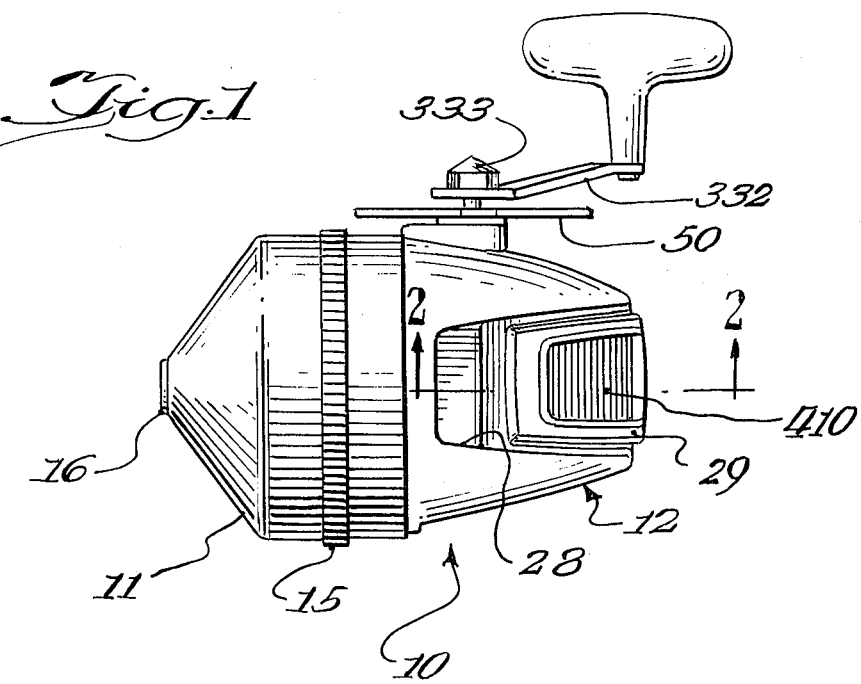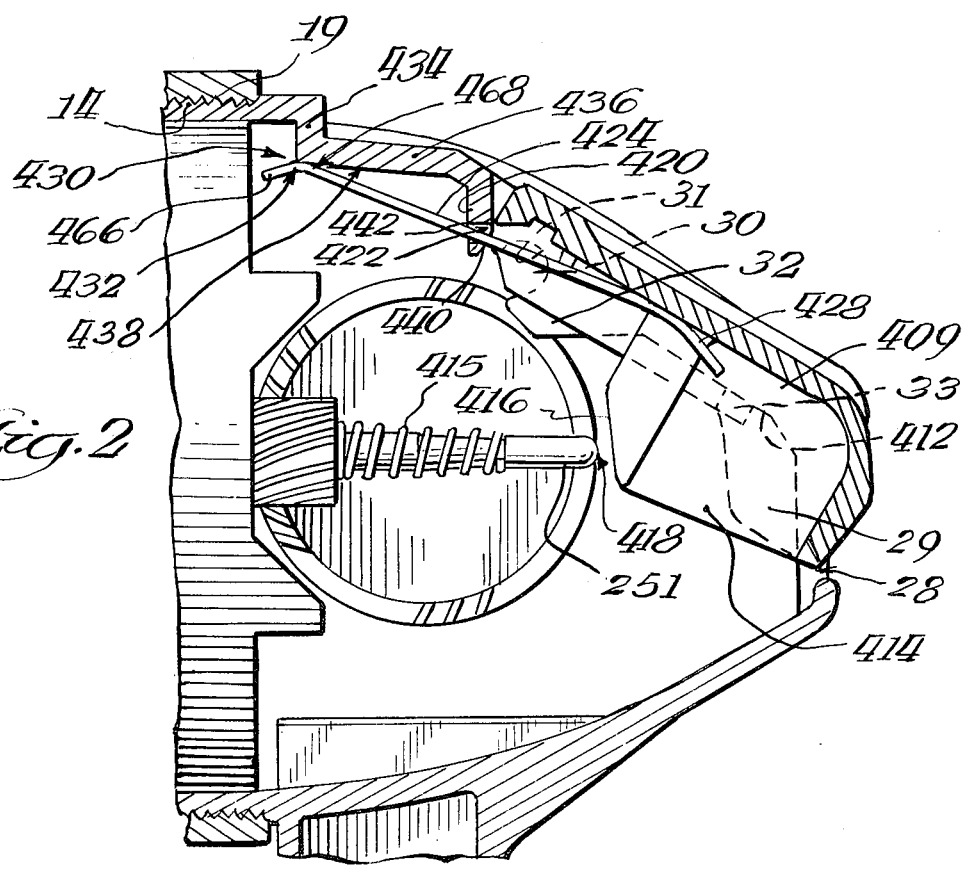

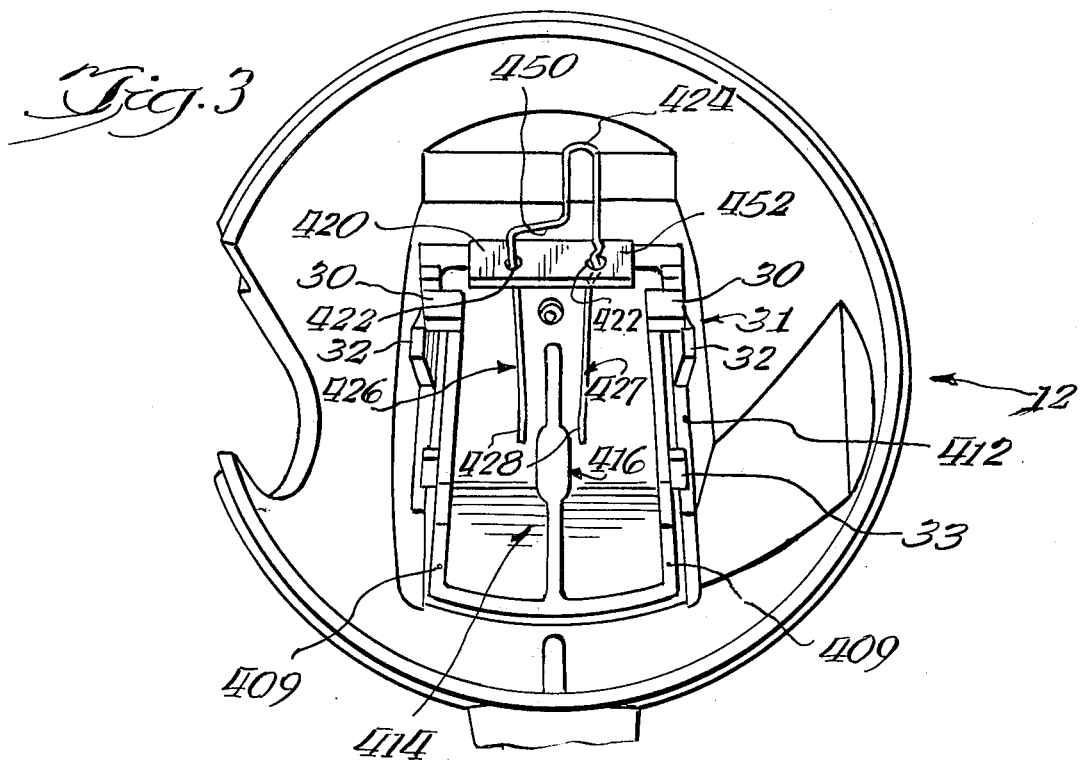
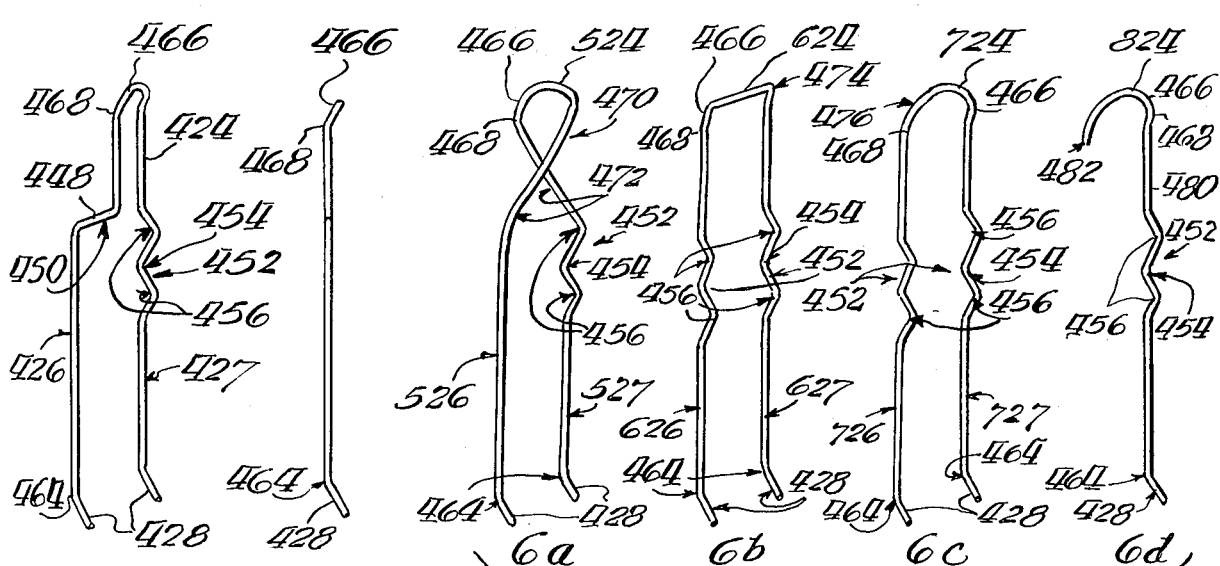

THUMB STOP RETENTION AND ANTI-RATTLE SPRING

This is a continuation of application Ser. No. 289,036 filed July 31, 1981, now abandoned.

TECHNICAL FIELD

This invention relates to spinning style fishing reels and, more particularly, to an improved means for retaining a thumb button in a reel housing.

BACKGROUND ART

In the traditional spinning reel construction, a depressible thumb button is pivotally secured to the reel casing and displaces a spinner head through an intermediate center shaft. As exemplified in U.S. Pat. Nos. 3,481,554 and 4,156,510 to Hull, issued respectively on Dec. 2, 1969 and May 29, 1979, a pair of opposed sidewardly extending pivots adjacent the forward portion of the thumb button are often snapped into slotted pivot openings in the walls of the rear cover. One or more tabs integrally formed with the button, as depicted in the former Hull patent, may be included toward the rear of the thumb button to abut a ledge on the inner surface of the rear cover so as to confine the rearward pivoting of the thumb button away from the depressed position. Unrestrained pivoting of the thumb button occurs between the rearmost position and the rearward position, where the button engages the center shaft, when a biasing means is absent as in common in the prior art reel construction. Consequently, an undesirable rattling might occur as the thumb button swings within the reel housing. With the reel in a substantially upright position, the weight of the thumb button urges the same into engagement with the rotating center shaft which causes wear on the button as well as aggravating the rattling problem.

Additionally, when the thumb button is depressed from adjacent its forward edge or the button is urged in a forward direction, the pivots tend to disengaged from the pivot openings, which action is resisted only by the restraining force of the walls of the pivot openings on the captured pivots.

The present invention is directed to overcoming one or more of the problems as set forth above.

DISCLOSURE OF THE INVENTION

The present invention comprehends the use of a spring means engageable with a reel housing and a pivotable thumb button so as to urge the button upwardly and away from its depressed position. The spring means comprise one or more elongate resilient legs which are engageable with and retained by a tab depending from the rear reel cover. The legs extend substantially longitudinally with respect to the thumb button and engage the underportion thereof. Means are included on said legs which coact with the tab to prevent displacement of the spring means when appropriately seated. The legs are laterally offset from the center of the thumb button so as not to interfere with the operation of the center shaft.

The spring means, by maintaining constant pressure on the button, prevent rattling, yet offer minimal resistance to the depression of the button by the operator. The rearwardly directed component of the spring force on the thumb button resists dislocation of the sidewardly extending pivots from the slotted pivot openings within which the pivots are seated.

BRIEF DESCRIPTION OF THE DRAWINGS

FIG. 1 is a top view of a spinning reel with a depressible thumb button.

FIG. 2 is an elevated, enlarged, partial cross-sectional view of the rear portion of the reel of FIG. 1 taken along line 2—2 incorporating the spring means of the present invention.

FIG. 3 is a perspective view of the rear portion of the reel of FIGS. 1 and 2.

FIG. 4 is an enlarged perspective view of the underside of a preferred form of spring means.

FIG. 5 is a side view of the spring means of FIG. 4.

FIG. 6a–d are enlarged perspective views of the underside of several alternate embodiments of the spring means.

BEST MODE FOR CARRYING OUT THE INVENTION

Referring initially to FIG. 1, there is shown a reel, including a closed face housing 10, comprising a cup-shaped front cover 11 and a rear cup-shaped cover 12. The front cover 11 has helical threads 14 formed on the rearmost internal surface thereof as shown in FIG. 2. The rear cover 12, has on its forwardly facing end portion an external thread 19, which mates with the threaded portion of the front cover 11. To facilitate manual rotation of the front cover, a knurled gripping portion 15 is included about the external surface of the same. An annular line guide 16 is mounted at the forward edge of the front cover 11. A crank shaft (not shown), through a handle 332 secured thereto by a nut 333, rotates center shaft 251, shown in FIG. 2, and a spinner head assembly (not shown). A star wheel 50 is rotatable relative to the crank shaft and about the same axis and controls the drag. The specific mechanism through which the reel is operated does not form a part of the present invention and thus detailed discussion of the same is omitted.

The rear cover 12 has a rearwardly facing opening 28 that is substantially rectangular in shape extending through a sloped upper portion and vertical rear portion thereof. A one piece thumb button 29 has a shape substantially mating with the shape of the opening 28 in the rear cover and includes opposed depending walls 409 adjacent the lateral edges of the button. The upper wall of the thumb button includes a plurality of laterally extending ridges 410 which prevent the operator's thumb or finger from slipping as the button is depressed.

As seen in FIGS. 2 and 3, a pair of opposing pivots 30 extend sidewardly from the upper forward side edges of the walls 409 and snap into slotted pivot openings 31 in the adjacent side walls 32 of the opening 28. A pair of sidewardly extending tabs 33 are formed in the sloping portion of the thumb button such that with the thumb button 29 assembled from the inside of the rear cover 12, the sidewardly extending pivots 30 will snap into the slotted openings 31 in the walls 32 of the rear cover 12 with the sidewardly extending tabs 33 abutting a sloping ledge 412 adjacent the edge of the opening 28. The tabs 33 prevent the thumb button 29 from pivoting rearwardly out of the opening 28 in the rear cover 12.

The center shaft 251 is displaced by depressing the thumb button 29 so as to rotate the same about the pivots 30 in a clockwise direction in FIG. 2. Upon depressing the button 29 a protruding ledge 414 depending from the underside of the button engages the center shaft after which continued depression compresses the spring 415 moving the shaft in the forward direction, to the left in FIG. 2. The ledge, as can be seen in FIG. 3, expanded laterally in the region 416 where it engages the center shaft to prevent the rounded edge 418 of the shaft from slipping off the surface of the ledge. Release of the thumb button 29 will permit the spring 415 to return the center shaft 251 and the thumb button 29 to the right in FIG. 2.

A tab 420 depends from the upper wall of the rear cover. Within the tab are included a pair of spaced apertures 422 through which a U-shaped spring member 424, which is discussed in detail hereafter, is extended. To assemble the thumb button, the pivots 30 are snapped into the slotted openings 31 and the button pivoted rearwardly until the tabs 33 abut the ledge 412 on the rear cover 12. The legs 426, 427 of the spring are inserted through the apertures and extended toward the rear of the reel guided by the underside of the button. To prevent the spring member from snagging on the button surface, the ends 428 of the legs are offset slightly downwardly. The spring member is extended rearwardly until the region 430 adjacent the closed end thereof seats on a squared edge 432 formed at the intersection of vertically and horizontally extending cover portions 434 and 436 respectively.

The particular location and dimension of the apertures are chosen so that the spring member engages simultaneously an edge 438 of the cover, the diagonally opposed forward edge 440 and rearward edge 442 of the apertures and the underside of the thumb button without substantially deforming the spring member, yet so as to maintain sufficient pressure on the button to prevent rattling. The apertures, as illustrated, are round openings bored substantially horizontally through the tab. In any event, the apertures are disposed laterally off center from the protruding ledge 414 so as not to interfere with the operation of the thumb button.

Several different configurations for the spring member 424 are shown in FIGS. 4-6. Generally speaking, the relationship between the legs of the spring members and the apertures in such that the spacing between the legs is either slightly greater or less than that of the apertures wherein the legs are simultaneously biased toward the inward or outward edges of the apertures. This facilitates mating with a locking portion of the spring member as described in the following paragraphs.

Referring specifically to FIG. 4, an isolated spring member 424 is illustrated, which is shown in its assembled position in FIG. 3. The spring is formed from a continuous resilient wire in a substantially U-shaped configuration. A first leg 426 of the spring is directed laterally, away from a second leg 427 intermediate the ends of the spring, the thereafter substantially parallel to the second leg so as to be offset slightly therefrom adjacent the open of the spring. The laterally directed portion 448 defines a stopping edge 450 which abuts the tab 420 when the spring is fully seated in the reel. The second leg 427 is formed in a zigzag 452 in the middle portion of the leg so as to define an offset portion 454 within which the tab 420 is received so as to prevent longitudinal displacement of the spring. As can be seen in FIG. 4, with the legs of the spring biased inwardly, two offsets 456 are included which are engageable with the tab. With the legs biased outwardly, only one such offset 454 is engageable with the tab. In FIG. 3 the spring 424 is extended such that the tab 420 intersects the zigzag portion 452 of the second leg 427, wherein the offsets 454, 456, are engageable with either wall of the tab 420.

As discussed previously, and most clearly illustrated in FIG. 5, the ends 428 of the legs of the spring are slightly offset so as to define a partially rounded surface 464 which prevents the spring from catching on the button as the spring is inserted into the reel. The opposing end of the spring may be similarly offset in the same direction thereby defining a turned edge or tab 466 which is more accessible when the spring is being assembled, as is illustrated in FIG. 2. Additionally the offset end 466 defines a rounded surface 468 which is engageable with the horizontal cover portion 436 to prevent retraction of the spring.

In FIGS. 6a-6d several alternate embodiments of the spring are illustrated. In FIG. 6a, a substantially U-shaped spring member 524 is twisted about itself adjacent its closed end so as to form a closed loop 470. The diagonally directed portions leading to the loop define a pair of stopping surfaces 472, which, comparably to the edge 450 shown in FIG. 4, prevent longitudinal displacement of the spring. Spring 524 has the same turned ends 428, 466, zigzag 452, offset portion 454, 456, and spaced legs 526, 527 respectively corresponding to the first and second legs in FIG. 4.

In FIG. 6b and 6c a pair of U-shaped springs 624, 724 respectively with corresponding first and second legs 626, 627 and 726, 727, are illustrated with respectively squared and rounded ends 474, 476 at the closed ends of the springs. Both of the embodiments include zigzag portions 452 on each leg, therein defining offsets 454, 456 which are simultaneously engageable with the tab 420. Springs 624 and 724 also have the same turned ends 428 and 466 as described with spring 424 of FIG. 4.

In FIG. 6d a hook-shaped spring 824 is illustrated with but a single leg 480. A zigzag portion 452 and offset portions 454, 456 are included on the leg 480, with the ends 428 and 466 thereof being turned as in the prior embodiments. The spring 824 is assembled in like manner with the leg 480 insertable in either aperture 422 in the tab 420. Preferably the leg 480 extends within the aperture occupied by the second leg 427 illustrated in FIG. 3 such that the curved end 482 is centered along the width of the housing and the leg 480 is longitudinally aligned with the thumb button 29.

The specific forms of the invention illustrated and described herein as intended to be representative only, as certain changes and modifications may be made without departing from the scope of the teachings herein disclosed. Accordingly, reference should be made to the appended claims in ascertaining the full scope of the invention.

I claim:

1. In a spinning reel having a rotatable spinner head retained within a housing, which spinner head is displaceable axially by depressing a pivotable thumb button, and stop means associated with the thumb button which abut the reel housing to confine the rearward rotation of the button away from its depressed position, the improvement comprising:
   outwardly extending pivots on the button and received in slotted openings in the housing, the button being pivotable about the pivots;
   an elongate resilient spring member engageable with the housing and with the underside of the thumb button, said elongate resilient spring member is comprised of a pair of spaced, substantially parallel, elongate legs interconnected by a closed end, a portion of one of the legs being offset away from the other leg to define a substantially laterally extending edge; and tab means associated with the housing and engageable with the legs of the elongate resilient member at an intermediate position thereon, the tab means including at least one aperture through which the leg of the elongate resilient member having the offset portion is extended, the laterally extending edge of the offset portion of the leg engaging the tab at the edge of the aperture to restrain longitudinal movement of the resilient member relative to the housing, the resilient member biases the stop means toward the reel housing and retains the pivots in the slotted openings.

2. The spinning reel of claim 1 wherein the elongate resilient spring member is substantially U-shaped with a portion of the other of the legs is offset away from the one leg so as to define a substantially laterally extending edge in the other leg, which edge is engageable with the tab means to prevent longitudinal displacement of the elongate resilient spring member.

3. The spinning reel of claim 1 wherein the elongate resilient spring member is substantially U-shaped with the portion adjacent the base of the U being folded over about itself so as to form a closed loop.

4. The spinning reel of claim 1 wherein the elongate resilient spring member includes a zigzag portion which defines the offset in the one leg.

5. The spinning reel of claim 1 wherein the elongate resilient member is a U-shaped spring and includes a downwardly offset portion engageable with the button to facilitate assembly within the reel.

* * * * *